(No Model.) 2 Sheets—Sheet 1.
T. HIGGIN.
METHOD OF SEPARATING IMPURITIES FROM SALT.
No. 422,939. Patented Mar. 11, 1890.
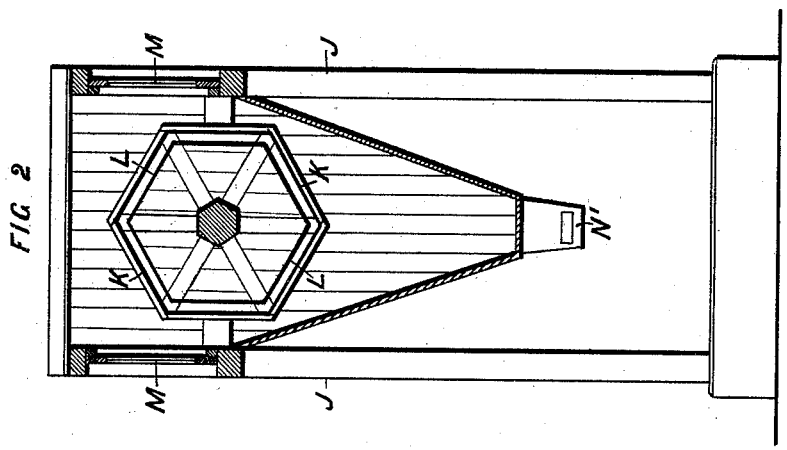
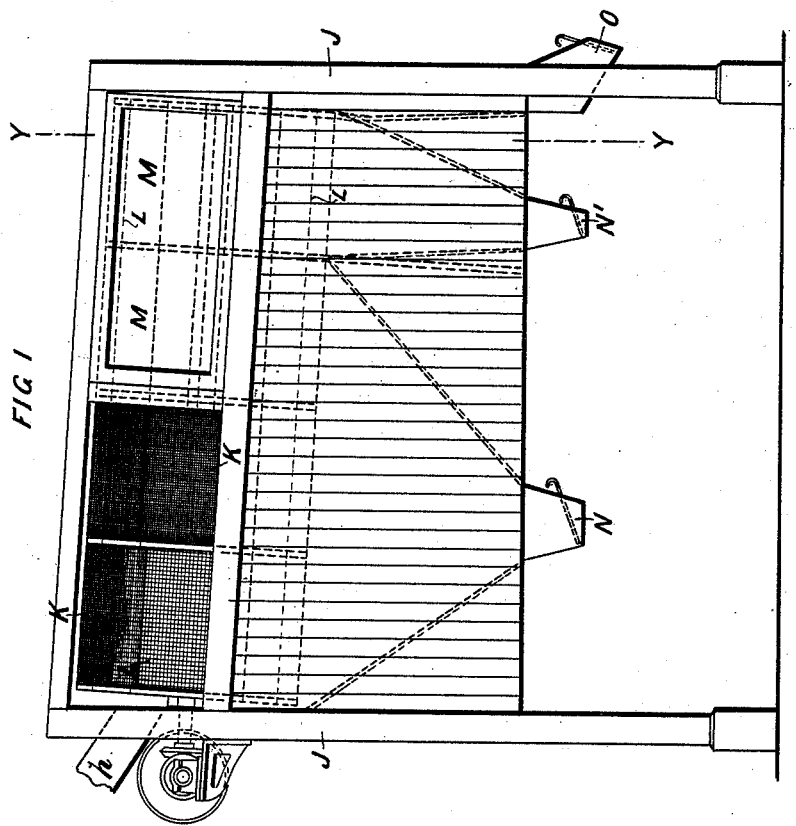
WITNESSES
INVENTOR (No Model.) 2 Sheets—Sheet 2.
T. HIGGIN.
METHOD OF SEPARATING IMPURITIES FROM SALT.
No. 422,939. Patented Mar. 11, 1890.
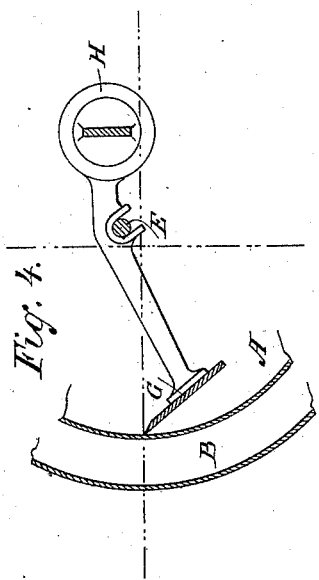
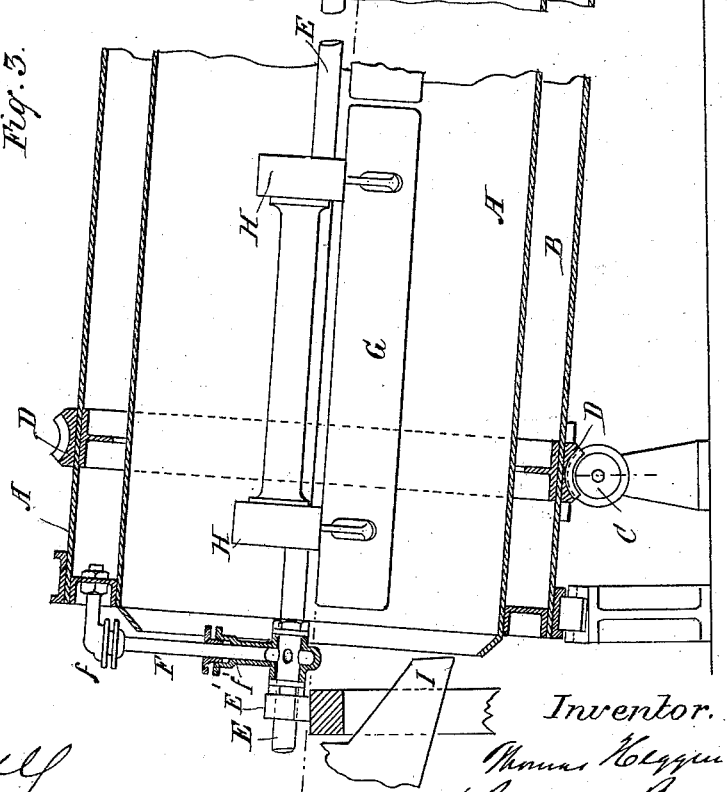
Witnesses.
Inventor.

UNITED STATES PATENT OFFICE.

THOMAS HIGGIN, OF LIVERPOOL, COUNTY OF LANCASTER, ASSIGNOR, BY MESNE ASSIGNMENTS, TO THE SALT UNION, (LIMITED,) OF LONDON, ENGLAND.

METHOD OF SEPARATING IMPURITIES FROM SALT.

SPECIFICATION forming part of Letters Patent No. 422,939, dated March 11, 1890.

Application filed April 26, 1887. Serial No. 236,136. (No model.)

*To all whom it may concern:*

Be it known that I, THOMAS HIGGIN, a subject of the Queen of Great Britain, and a resident of the city of Liverpool, England, have invented certain new and useful Improvements in the Method of Separating Impurities from Salt, of which the following is a description in such full, clear, concise, and exact terms as will enable any one skilled in the art or science to which my invention belongs, or with which it is most nearly connected, to make and use the same, reference being had to the accompanying drawings, making part of this specification, and to the letters marked thereon.

In the said drawings, Figure 1 is an elevation of a salt-sieving reel suitable to be used in the practice of my invention, and Fig. 2 is a section of the same on the line Y Y of Fig. 1. Fig. 3 is a side elevation of a device for drying the salt, so that the sand-scale and pan-scale and other impurities are left in pieces separate from the salt and larger than the salt-crystals. Fig. 4 is a detail view of part of the apparatus shown in Fig. 3.

My invention consists of an improved method or process of manufacturing salt free from sand-scale, pan-scale, and other impurities.

When salt is reduced to a marketable condition by grinding or beating or hammering, the sand-scale, pan-scale, sulphates, and other impurities are all broken up and mixed with the salt, and it is not, therefore, possible subsequently to remove them by screening or sieving. Such salt is inferior for all uses; but it is especially objectionable for use in making dairy products, because the pan-scale, sulphates, and other impurities are insoluble in butter and cheese, and therefore the value of the articles in a considerable degree depends upon the purity of the salt used.

Prior to the date of filing this application, salt has been treated for the purpose of reducing the salt to its ultimate crystals without pulverizing the impurities by subjecting lump-salt to the action of knives or cutters. This method reduces the salt to such a condition that instead of the pan-scale being pulverized with the salt it is left in the salt in particles of sufficient size to enable its removal from the pulverized salt by sieving. Although effective, this method does not reduce salt into a condition in which the softer scales or impurities—such as sand-scale—can be removed by sieving, as they are by the action of the apparatus sometimes broken up into small pieces and mixed inseparably with the salt. The lumps have also been disintegrated by hackling or tearing as distinguished from crushing, pulverizing, or chipping. While this method is very much better than that hereinbefore enumerated, yet in this method there is some danger of breaking the softest scales if care is not exercised. My present improvement avoids all these difficulties, reducing the danger of breaking any of the scales to the minimum and insuring the production of a superior grade of salt.

In the practice of my invention I proceed in the ordinary manner to evaporate brine in suitable tanks heated by any suitable means. The salt is removed from these tanks before it has been dried sufficiently to consolidate it in hard lumps or masses, and is placed, preferably, in heated pans, which are kept in a state of agitation, the object being to bring all the particles of salt in contact with the heated surface of the pan and to prevent scorching and to promote crystallization and drying without breaking up the sand-scale, pan-scale, and other impurities which are left intact among and separate from the grains of pure crystals of salt which are formed in the process of evaporating. Any suitable device for agitating the salt while it is being dried may be employed as long as such agitation does not disintegrate or break up the chips of the hard pan-scale or softer sand-scale during the drying process, and which leaves the same distributed through the salt in particles of larger size than that of the salt crystals. A suitable device for this purpose is illustrated in Figs. 3 and 4. The salt, with its contained impurities, is then removed from said pans and is passed through sieves of silk, wire, or other gauze of suitable mesh to permit the salt to pass the sieves, while the impurities are caught by the sieves, being unable to pass through them, and are discharged as waste, while the salt, if desirable, may be separated into different grades of fineness during the same operation. A device suitable for this purpose is shown in Figs. 1 and 2. Referring to the drawings, Figs. 1 and 2, the rotary sieving apparatus therein shown consists of a reel K of hexagonal construction. The sides of the reel K are provided with wire, silk, or other suitable gauze which may have meshes of varying grades in the direction of its length. The reel K is provided with an inner riddle L for separating and collecting the larger lumps of impurities. In the drawings the outer gauze is partially removed to show the inner riddle L, and one of the removable covers M is removed. The apparatus is constructed to grade the salt in two qualities or grades, and for this purpose there are provided two chutes N and N', and the reel is provided with two grades of gauze. The reel is mounted upon a shaft and is rotated in any known way. The impurities are fed into the reel with the salt and are separated therein, the salt passing through the meshes of the gauze and the impurities passing through the reel L and falling into and down a chute O at the end of the apparatus.

The drying apparatus (shown in sectional elevation in Fig. 3, and a detail of which is shown in cross-section in Fig. 4) consists of a cylindrical vessel A, having a jacket or casing B, into which steam, heated air, and hot products of combustion of coal or other fuel is or are led, and by which the vessel A is heated. The vessel A is mounted and works on peripherical roller-bearings B' of known type, and is rotated by a worm C and circular worm-rack D. The heating medium is supplied to the jacket B by a pipe or hollow shaft E, which communicates with the jacket B by a pipe F, having a universal joint at $f$ and an expansion-joint at $f'$, of ordinary construction. These joints are provided to allow the pipe F to work, the working of the pipe being due to the eccentricity of the pipe F in the vessel A. The pipe or shaft E is mounted in bearings E' at each end of the machine. The vessel A is arranged and works in an inclined position. The partially-dried salt is fed into it at the higher end through the chute I, and leaves it by a chute J at the opposite end. The salt is agitated in passing through the vessel A by the revolution of said vessel, and also, preferably, by the scrapers G, which are mounted loosely upon the eccentrically-arranged shaft E, and are kept up to the interior wall of the vessel A by counter-weights H. These scrapers serve to remove all particles of salt or impurities that may adhere to the surface of the vessel. The revolving of the vessel A and the action of the scrapers G together afford the necessary agitation to bring the particles of salt to crystals and to leave the impurities in the salt in particles of sufficient size to enable their removal by the process of sieving.

The formation and drying of the salt crystals separate from the impurities and the subsequent separation of the salt from said impurities enable me to produce salt of a very superior quality, because by separating the impurities from the salt in the manner described I avoid the necessity of breaking up the salt from lumps, and thus liberating them by mechanical means after the salt has crystallized.

It will be understood that I do not confine my invention to the devices and combination of devices described, since any suitable devices having similar functions may be employed to accomplish the results sought.

Having described my invention, I claim—

The method of removing sand-scale, pan-scale, and similar impurities from salt, which method consists of evaporating a part of the water contained in the brine without carrying the said evaporating process far enough to cement the salt crystals together in hard masses, then subjecting the salt thus obtained to agitation while it is being dried for the purpose of separating the crystals of salt from the accompanying impurities without disintegrating the latter, and then passing the dried salt and said impurities over sieves by which the impurities are removed from the salt.

THOMAS HIGGIN.

Witnesses:
  THOS. H. HIGGIN,
  W. H. WILLIAMS,
*Both of 33 Tower Bldgs., Water St., Liverpool.*